United States Patent Office 3,632,656
Patented Jan. 4, 1972

3,632,656
CRYSTALLIZATION OF MANNITOL
Altan A. Unver, Tarsus, Turkey, assignor to Atlas Chemical Industries, Inc., Wilmington, Del.
No Drawing. Filed Apr. 13, 1967, Ser. No. 630,536
Int. Cl. C07c *31/26, 29/24*
U.S. Cl. 260—635 R     2 Claims

ABSTRACT OF THE DISCLOSURE

The recovery of mannitol from aqueous solutions of mannitol and sorbitol is improved by separating the mannitol in the form of plate crystals, grown by seeding the said solution, at a temperature below the saturation temperature for mannitol, with mannitol crystals in plate form. Mannitol crystals in plate form are obtained by feeding an aqueous solution containing dissolved mannitol and sorbitol into a vessel containing a slurry of mannitol crystals in an aqueous solution of mannitol and sorbitol, while maintaining the slurry at a temperature below the saturation temperature of the feed solution with respect to mannitol, and withdrawing total mixture from the vessel at the same rate as the feed solution is added, the said rate being such as to establish an average holding time of from 2 to 15 hours in the vessel, and continuing the addition of feed solution and withdrawal of total mixture until the suspended mannitol crystals are in the form of plates.

---

This invention relates to a new crystalline form of mannitol and to the crystallization of mannitol. More particularly, this invention relates to mannitol crystals in the form of plates and to the separation of mannitol from its aqueous solution in admixture with sorbitol.

A large proportion of the mannitol of commerce is produced by the reduction of hexoses or mixtures of hexoses, particularly of fructose-containing products such as inverted sucrose, alkali-isomerized glucose, and the like. Processes for such reduction, by electrolytic reduction or by hydrogenation of aqueous solutions of the sugar under pressure and in the presence of catalyst, are fully described in the patent literature. When mannitol is produced from the readily available inverted sucrose or from a glucose, sorbitol is always formed simultaneously; and a separation process must be applied to the reduced product to obtain pure mannitol.

In the present commercial practice, mannitol is recovered from its admixture with sorbitol in aqueous solution by a crystallization process based on the considerably lower solubility of mannitol than of sorbitol in water. Briefly, a hot, concentrated solution of the sorbitol-mannitol mixture is cooled to below the saturation temperature for mannitol in the aqueous sorbitol medium, seeded with mannitol needle-shaped crystals and further cooled with agitation. As crystallization proceeds, the magma becomes thick; and it is customary to periodically filter the crystals from a portion of the magma, returning the filtrate to the crystallizing vessel and continuing the cooling. In cooling from 60° C. to 20° C., for example, as many as 4 or 5 such "strikes" may be taken at progressively lower temperatures to prevent the accumulation of so much crystal in the charge that the magna would be impossible to pump and filter.

The crystals of mannitol formed under the conditions described are needle-shaped and have always offered considerable resistance to filtration so that the filtration rate is unsatisfactorily slow and the filter cake does not purge well. As a result, long filtration times are required, and the filter cake retains an undesirably large quantity of mother liquor which, of course, reduces the cake purity. Separation of the needle-shaped mannitol crystals from mother liquor by centrifuging is not feasible due to the extremely long time required.

An object of this invention is to provide an improved process for preparing mannitol.

Another object of this invention is to provide an improved process for the crystallization of mannitol to produce magmas which filter rapidly yielding filter cakes which purge well.

Another object of this invention is to provide an improved process for the crystallization of mannitol to produce magmas which centrifuge rapidly.

A further object is to provide a process for preparing mannitol in plate form.

A further object is to provide mannitol crystals in the form of plates.

Other objects of the invention will become apparent in the following description of the invention and in the appended claims.

In accordance with the present invention, the process described above is improved by cooling the hot solution, saturated or supersaturated with respect to mannitol, in the presence of seed crystals of mannitol in the form of plates instead of needles. It is found that when this is done the mannitol crystallizes in the form of plates instead of needles, and the resulting magma filters more rapidly and purges well. Shorter filtration times and higher cake purities are thus obtained, the operation is speeded up and the amount of material to be handled in recrystallization of crude cakes is diminished.

In the preparation of crystalline mannitol in plate form, in accordance with this invention, there is first prepared a slurry of mannitol crystals in an aqueous solution of sorbitol and mannitol which solution is supersaturated with respect to mannitol and which slurry has the same overall composition as the feed solution from which it is desired to crystallize mannitol. In order to do this, the said feed solution, at a temperature above its saturation temperature with respect to mannitol, is introduced into an agitated crystallizing vessel equipped with heat exchanging means and cooled to from 10° C. to 30° C. below the said saturation temperature. Spontaneous nucleation of mannitol in the form of needles will occur, or if desired, the formation of crystals may be hastened by adding a small quantity of powdered crystaline mannitol in the form of needles.

The slurry thus formed is held at a constant temperature in the range of from 10° C. to 30° C. below the saturation temperature of the said feed solution and the addition of feed solution, at a temperature above its saturation temperature, is started. The rate of addition is from one fifteenth to one half, by volume, of the charge in the crystallizer per hour and magma is withdrawn from the crystallizer at substantially the same rate as feed solution is added so that the volume in the crystallizer remains substantially constant. The average residence time of the feed solution in the crystallizer is thus from two to fifteen hours.

It is found on examination that the crystals in the first withdrawn magma under these conditions are initially nearly all in the form of needles but as the process is continued crystals in plate form begin to appear and the proportion of plates to needles increases steadily until substantially all of the crystals are in the form of plates. During the period described the withdrawn magma comprising needles or mixtures of needles and plate may, if desired, be heated to above the saturation temperature for mannitol in the mixture and returned to the feed solution. Alternatively, it may be cooled under agitation to separate further mannitol crystals as described hereinbefore.

When a magma wherein the mannitol crystals are substantially all in plate form is being withdrawn it is ready for use in producing crystalline mannitol in accordance with the process of the invention. This may be accomplished by progressively cooling the magma itself and removing successive "strikes" of mannitol crystals therefrom as described hereinbefore.

The process of the present invention is applicable to crystallizing mannitol from aqueous solutions of any degree of purity, for example, the aqueous solution may contain from 1 to 100% mannitol, dry basis. However, the advantages of improved filtration rate and purgeability of filter cake are most noticeable when the mother liquor contains substantial proportions of sorbitol. The process is therefore most useful when the feed solution contains from 15% to 90%, and preferably from 50% to 80%, by weight of sorbitol, based on solids content, the balance being substantially mannitol.

The saturation temperature of the feed solution with respect to mannitol is dependent upon both the mannitol-sorbitol ratio and the water content of the solution and, for any given solution, is readily approximated by adjusting samples of the solution to a series of temperatures, stirring in a pinch of powdered crystalline mannitol and observing whether the crystals dissolve or grow. At the exact saturation, of course, they will do neither. As a guide for establishing the ranges within which to look for the saturation temperature of a particular solution, the saturation temperatures of some representative solutions are tabulated below.

SATURATION TEMPERATURES WITH RESPECT TO MANNITOL IN MANNITOL-SORBITOL-WATER SYSTEMS

| | Percent mannitol on dry basis | Saturation temp., ° C. |
|---|---|---|
| Percent water on total basis: | | |
| 35 | 20 | 50 |
| 25 | 30 | 77 |
| 45 | 50 | 61 |
| 60 | 75 | 53 |

The crystalline mannitol in the form of plates disclosed herein is a distinctly different crystalline form of mannitol from the crystalline mannitol known prior to this invention. Mannitol crystals in the form of plates may be readily identified by X-ray diffraction analysis, differential thermal analysis, or infrared analysis. X-ray diffraction analysis of mannitol crystals in the form of plates, using X-rays from a copper target, yield powder diagrams wherein the d-spacing of the strongest line is at about 9 angstroms. Differential thermal analysis of mannitol crystals in the form of plates show an exothermic peak at about 156° C. The infrared absorption spectrum of mannitol crystals in the form of plates is distinctly different from the ASTM spectrum for mannitol (ASTM Number 6943).

The invention will be better understood from the following specific examples which are presented for illustrative purposes and are not to be construed as limiting the scope of the appended claims.

Examples 1 and 2 illustrate the preparation of magma containing crystalline mannitol in plate form from aqueous solutions of sorbitol-mannitol mixtures.

EXAMPLE 1

A 130 gallon Kilby type crystallizing vessel is filled with a slurry of mannitol crystals in an aqueous solution of sorbitol and mannitol. The slurry is slowly stirred and maintained at a temperature of 53° C. An aqueous solution of mannitol and sorbitol containing 30% mannitol and 70% sorbitol (dry basis) and 25% water (based on total weight) is heated to 77° C. and added continuously to the slurry while maintaining the temperature of the slurry at 53° C. The mixture of feed solution and slurry is withdrawn at the same rate as the feed solution is added. The feed solution is added at the rate of 20 to 25 gallons per hour to establish an average holding time of approximately six hours. A steady state is reached after ten days operation in which the withdrawn slurry contains approximately 16% of mannitol crystals (on basis of dry solids) substantially all of which are plates.

An X-ray powder diagram of mannitol crystals in the form of plates was obtained using a Tem-Pres Unit XD–1 diffractometer according to the following procedure. 0.1 gram of mannitol crystals in the form of plates were slurried with ethyl alcohol, placed on a glass slide, and the alcohol evaporated. The mannitol on the glass slide was about the size of a dime and opaque to light. X-rays from a copper target were passed through a nickel filter and impinged upon the mannitol sample. The diffracted X-rays were intercepted by a radiation detector coupled to a strip chart recorder and the diffracted intensity (number of counts per unit time) versus diffraction angle plotted. The d-spacings of the three strongest lines are shown in the following table along with the d-spacings of the three strongest lines from the ASTM powder diagram for mannitol (ASTM Number 8–753).

X-RAY POWDER DIAGRAM DATA d-SPACINGS OF THE THREE STRONGEST LINES IN ANGSTROMS

| | | | |
|---|---|---|---|
| Mannitol plates | 9.00 | 4.47 | 4.31 |
| ASTM 8–753 | 4.74 | 3.80 | 4.21 |

EXAMPLE 2

A 130 gallon vertical tank having an inlet at the top, an outlet at the bottom, cooling coils for maintaining constant temperature, and equipped with a stirrer is used as a crystallizing vessel. The crystallizing vessel is filled with 130 gallons of aqueous feed solution at 78° C. and containing 30% mannitol and 70% sorbitol (dry basis) and 26% water, based on total weight. The solution is cooled to 68° C., seeded with mannitol crystals, and cooled to 55° C. to form a slurry of mannitol crystals in an aqueous solution of mannitol and sorbitol. An aqueous feed solution at 78° C. containing 30% mannitol and 70% sorbitol, based on total solids, and 26% water, based on the total weight of solution, is added to the slurry while maintaining the temperature of the resulting mixture at 55° C. The resulting mixture is withdrawn from the crystallizing vessel at the same rate as the feed solution is added so as to maintain the volume of material in the crystallizing tank constant. The rate of addition and withdrawal is 40 to 45 gallons per hour to establish an average holding time in the tank of about three hours. When a steady state is reached the withdrawn magma contains approximately half of its total mannitol content as crystals in plate form, the remainder being in solution.

Differential thermal analysis curves for mannitol plates and the usual needle forms of mannitol were obtained using a Du Pont 900 Differential Thermal Analyzer. The endothermic and exothermic peaks for each sample are shown in the following table.

DIFFERENTIAL THERMAL ANALYSIS DATA

| Mannitol sample | Maxima of endothermic peaks | Maxima of exothermic peaks |
|---|---|---|
| Mannitol plates | 1 peak, 167° C. | 1 peak, 156° C. |
| Mannitol needles | do | None. |

The following examples illustrate the crystallization of mannitol from aqueous solutions of mannitol and sorbitol using mannitol crystals in plate form as the seed.

EXAMPLE 3

A magma of mannitol crystals in plate form in an aqueous sorbitol-mannitol solution prepared as described in the foregoing examples was transferred to a stirred crystallizing vessel equipped with cooling coils. The initial conditions were as follows:

| | | |
|---|---|---|
| Wt. magma charged | lbs | 270 |
| Percent water in magma | percent | 24.11 |
| Percent mannitol in charge (D.B.) | do | 30.92 |
| Percent mannitol as crystals (D.B.) | do | 15.2 |
| Initial temperature | ° C | 53 |

The charge was cooled at the rate of 3° C. per hour. When the viscosity of the magma had increased to 900 cp. a quantity to yield approximately 10 lbs. of wet filter cake was withdrawn and filtered through a plate and frame filter press. The cake was not washed but was blown with air for 45 minutes to expel as much adhering mother liquor as possible. The filtrate and expelled mother liquor were returned to the crystallizer, thinning the magma somewhat and cooling was continued. When the viscosity had increased to 900 cp. again, a second "strike" of crystals was withdrawn and filtered off in the same manner, the filtrate again being returned to the crystallizer. The process was repeated through five withdrawals, when the temperature had decreased to 18° C. The slurry was stirred another hour at that temperature and filtered, the filtrate being sent to storage. Pertinent data concerning the several withdrawals are tabulated. Filtration rates, in all but the clean-up strike were very satisfactory and the cake purities were uniformly high.

| Strike No. | 1 | 2 | 3 | 4 | 5 | 6 |
|---|---|---|---|---|---|---|
| Strike temp, ° C | 38 | 35 | 32 | 25 | 17.8 | 18.2 |
| Filtration time, min | 14 | 10 | 11 | 18 | 18 | 27 |
| Cake wt. (W.B.), lbs | 11.0 | 12.0 | 11.5 | 11.2 | 11.0 | 11.0 |
| Cake analysis: | | | | | | |
| percent $H_2O$ | | | | 9.30 | 10.84 | 11.34 | 8.79 |
| Percent mannitol (D.B.) | | | | 74.93 | 75.03 | 74.90 | 78.63 |
| Filtrate analysis: | | | | | | |
| Percent $H_2O$ | | | | 31.81 | 33.94 | 32.44 |
| Percent mannitol (D.B.) | | | | 8.56 | 6.69 | 7.03 |

EXAMPLE 4

A batch crystallizer was charged with 260 lbs. of PAI, an aqueous solution of alcohols resulting from the hydrogenation of invert sugar solution, containing 29.5% mannitol (dry basis), 70.5% sorbitol (dry basis), and 25.74% water (based on total weight). The solution entered the crystallizer at 82° C. and was cooled to 70° C. The solution was then seeded with 0.3%, based on the weight of solids, of crude cake mannitol crystals on the form of plates from a previous crystallization. Cooling was continued at the rate of 3° C. per hour. When the viscosity of the magma had increased to 900 cp. a quantity to yield approximately 10 lbs. of wet filter cake was withdrawn and filtered through a plate and frame filter press. The cake was blown with air for 45 minutes to expel as much adhering mother liquor as possible. The filtrate and expelled mother liquor were returned to the crystallizer, thereby thinning the magma. Cooling was continued. When the viscosity of the magma had increased to 900 cp. again, due to the growth of more crystals, a second "strike" of crystals was withdrawn and filtered off in the same manner, the filtrate again being returned to the crystallizer. The process was repeated through five withdrawals, at which time the temperature had decreased to 18° C. The slurry was stirred one hour at 18° C. and filtered. The mannitol filtered out in all the various "strikes" was in the form of plate crystals.

Although the present invention has been described with reference to particular embodiments and examples, it will be apparent to those skilled in the art that variations and modifications thereof can be made without departing from the principles and true spirit of the invention.

Having described the invention what is desired to be secured by Letters Patent is:

1. A process of preparing mannitol crystals in the form of plates from aqueous solution containing dissolved mannitol and sorbitol which comprises continuously feeding said solution into a stirred crystallizing vessel containing a slurry of mannitol crystals in an aqueous solution of mannitol and sorbitol, while maintaining the slurry at a constant temperature in the range of from 10° C. to 30° C. below the saturation temperature of the feed solution with respect to mannitol, and withdrawing total mixture from said crystallizing vessel at substantially the same rate as the feed solution is added, the said rate being such as to establish an average holding time of from about 2 to about 15 hours in the crystallizing vessel, and continuing the addition of feed solution and withdrawal of total mixture until substantially all of the suspended mannitol crystals are in the form of plates.

2. The process of claim 1 wherein the ratio of mannitol to sorbitol in the said feed solution is from 10/90 to 85/15.

References Cited

UNITED STATES PATENTS

| 2,116,665 | 5/1938 | Brown | 260—637 |
| 2,634,298 | 4/1953 | Himel et al. | 260—237 |
| 2,723,295 | 11/1955 | Pence | 260—637 |
| 2,749,371 | 6/1956 | Kasehagen | 260—635 C |
| 2,768,980 | 10/1956 | Pence | 260—637 |

FOREIGN PATENTS

| 545,672 | 6/1942 | Great Britain | 260—637 |

OTHER REFERENCES

Vogel, "Practical Organic Chemistry," (1957), pp. 122–130.

Lange, "Handbook of Chemistry," 6th ed., (1946), pp. 518–519.

LEON ZITVER, Primary Examiner

J. E. EVANS, Assistant Examiner

U.S. Cl. X.R.

260—637 R